United States Patent [19]
Noonan et al.

[11] Patent Number: 5,957,218
[45] Date of Patent: Sep. 28, 1999

[54] ELECTROHYDRAULIC CONTROL OF IMPLEMENT LIFT CYLINDERS

[75] Inventors: James Thomas Noonan, Johnston; David Alan Payne, Urbandale; Paul David Parker, Ankeny, all of Iowa

[73] Assignee: Deere & Company, Moline, Ill.

[21] Appl. No.: 08/972,925

[22] Filed: Nov. 18, 1997

[51] Int. Cl.[6] .............................................. A01B 63/114
[52] U.S. Cl. ........................................ 172/239; 172/311
[58] Field of Search .................. 172/239, 4, 2, 172/311

[56] References Cited

U.S. PATENT DOCUMENTS

| | | |
|---|---|---|
| 3,663,032 | 5/1972 | Hook et al. . |
| 3,736,988 | 6/1973 | Cantral et al. ...................... 172/239 X |
| 3,759,332 | 9/1973 | Robertson, Sr. ........................ 172/239 |
| 3,889,760 | 6/1975 | Manor ................................. 172/239 X |
| 3,921,726 | 11/1975 | Connor et al. ...................... 172/239 X |
| 4,064,945 | 12/1977 | Haney ......................................... 172/4 |
| 4,176,721 | 12/1979 | Poggemiller et al. ....................... 172/4 |
| 4,817,729 | 4/1989 | McCormick ............................ 172/311 |
| 4,821,811 | 4/1989 | Swenson ................................. 172/248 |
| 5,450,908 | 9/1995 | Hagman et al. ........................ 172/239 |

Primary Examiner—Christopher J. Novosad

[57] ABSTRACT

An implement lift system including a plurality of individual electrohydraulically controlled cylinders spaced on a tool frame and connected to lift wheel. An implement control unit (ICU) in the towing vehicle cab is connected to feedback potentiometers or similar transducers which provide signals corresponding to cylinder stroke length or suspension position. The feedback signals are compared at the ICU to a control signal obtained by rotation of a lever or knob on an operator control unit in the cab. Depending on the cylinder position relative to the operator selected position, the ICU provides an output signal to the electrohydraulic valve to achieve a proportional amount of flow for the desired cylinder position. The ICU also compares feedback signals from the transducers and adjusts the output voltage to each of the valves so that the frame can be raised and lowered evenly. In conditions where independent adjustment of different frame portions is desired, the operator control unit can be adjusted to provide the necessary offset signal for each section. The lift system provides uniform depth control and level lift for different frame configurations including frames with wings. Systems with dissimilar cylinders having different capacities or stroke lengths are easily accommodated.

24 Claims, 3 Drawing Sheets

ELECTROHYDRAULIC CONTROL OF IMPLEMENT LIFT CYLINDERS

BACKGROUND OF THE INVENTION

1) Field of the Invention:

The present invention relates generally to agricultural implements, and, more specifically, to a lift and depth control systems for such implements.

2) Related Art:

Most available multi-frame implements such as field cultivators and chisel plows use a hydraulic cylinder system to provide depth control during field-working operations and adequate ground clearance during transport. Some depth control systems such as shown in U.S. Pat. No. 3,663,032 use rephasing cylinders connected in series to raise and lower the frames in unison. A flow control valve on the towing vehicle extends or retracts the series connected cylinders in unison. The cylinder capacities and strokes must usually be carefully matched for proper cylinder operation. Also, leakage across the ram seals of one or more of the cylinders causes the cylinders to get out of phase, which results in uneven operation across the width of the machine. To rephase the cylinders, the machine normally must be fully raised, which results in loss of time and operating efficiency. Other systems rely on mechanical depth stops to control operating height, but do not allow the operator to change that height from the cab or to easily vary depth for different transport conditions, ground contours and soil conditions. In addition, both the series cylinder and the mechanical depth stop systems require mechanical adjustment outside the cab to adjust the height of wing frames relative to the main or center frame. Adequate level control for fore-and-aft frame leveling or tilt and for leveling from side to side have presented problems.

On implement frames with a main frame and individual wing sections, depth of penetration of the wing sections often varies from that of the main frame, but the cylinder arrangement fails to accommodate easy and reliable adjustments of the wing sections relative to the main frame. Wing section cylinder stroke and size sometimes is determined by the cylinder matching requirements of the hydraulic system rather than by lift capacity and space considerations so that the cylinders are not optimal or most economical.

BRIEF SUMMARY OF THE INVENTION

It is therefore an object of the present invention to provide an improved implement lift or depth control system. It is a further object to provide such an improved system which overcomes most or all of the aforementioned problems.

It is a further object of the present invention to provide an improved implement lift or depth control system which provides accurate depth control across the entire width of the machine. It is another object to provide such a system which eliminates rephasing hardware and mechanical stops and maintains control even when cylinder leakage is present. It is still another object to provide such a system which can be easily controlled and adjusted from the cab of the towing vehicle.

It is still another object of the present invention to provide an improved implement lift or depth control system having substantially more flexibility and adjustablility than at least most previously available control systems. It is another object to provide such a system which accommodates cylinders of different sizes and stroke lengths and optimizes cylinder selection.

It is a further object to provide invention to provide an improved implement lift or depth control system which permits one portion of the implement frame, for example, a wing section, to be controlled differently than another section, such as the center frame section. It is another object to provide such a system facilitating easy relative adjustment of the lift cylinders.

It is still another object to provide an improved implement lift control system having independently controlled lift cylinders that are adjustable relative to each other from the tractor cab and eliminate need for mechanical stops, carefully matched cylinders, or rephasing systems while still maintaining level lift capability. It is yet another object to provide such a system which is particularly useful with winged implements for controlling the wing sections relative to the main frame sections. It is yet another object to provide such a system which can accurately control frame lift, both in the fore-and-aft direction and in a direction transverse to the forward direction.

An implement lift system including a plurality of individual electrohydraulically controlled cylinders spaced on a tool frame and connected to frame suspension structure such as lift wheel assemblies. An implement control unit (ICU) in the towing vehicle cab is connected to feedback potentiometers or similar transducers which provide signals corresponding to cylinder stroke length or suspension position. The feedback signals are compared at the ICU to a control signal obtained by rotation of a lever or knob on an operator control unit in the cab. Depending on the cylinder position relative to the operator selected position, the ICU provides an output signal to the electrohydraulic valve to achieve a proportional amount of flow for the desired cylinder position. The ICU also compares feedback signals from the transducers and adjusts the output voltage to each of the valves so that the frame can be raised and lowered evenly. In conditions where independent adjustment of different frame portions is desired, the operator control unit can be adjusted to provide the necessary offset signal for each section. The lift system provides uniform depth control and level lift, even with dissimilar cylinders with different capacities and stroke lengths. Level lift and depth control can be achieved, relative to both the fore-and-aft and transverse directions.

These and other objects, features and advantages of the present invention will become apparent to one skilled in the art upon reading the following detailed description in view of the drawings.

BRIEF DESCRIPTION OF THE DRAWINGS

FIG. 3 is a schematic of an alternate valve for use with the circuit of FIG. 2.

DETAILED DESCRIPTION OF THE DRAWINGS

Figure 1:
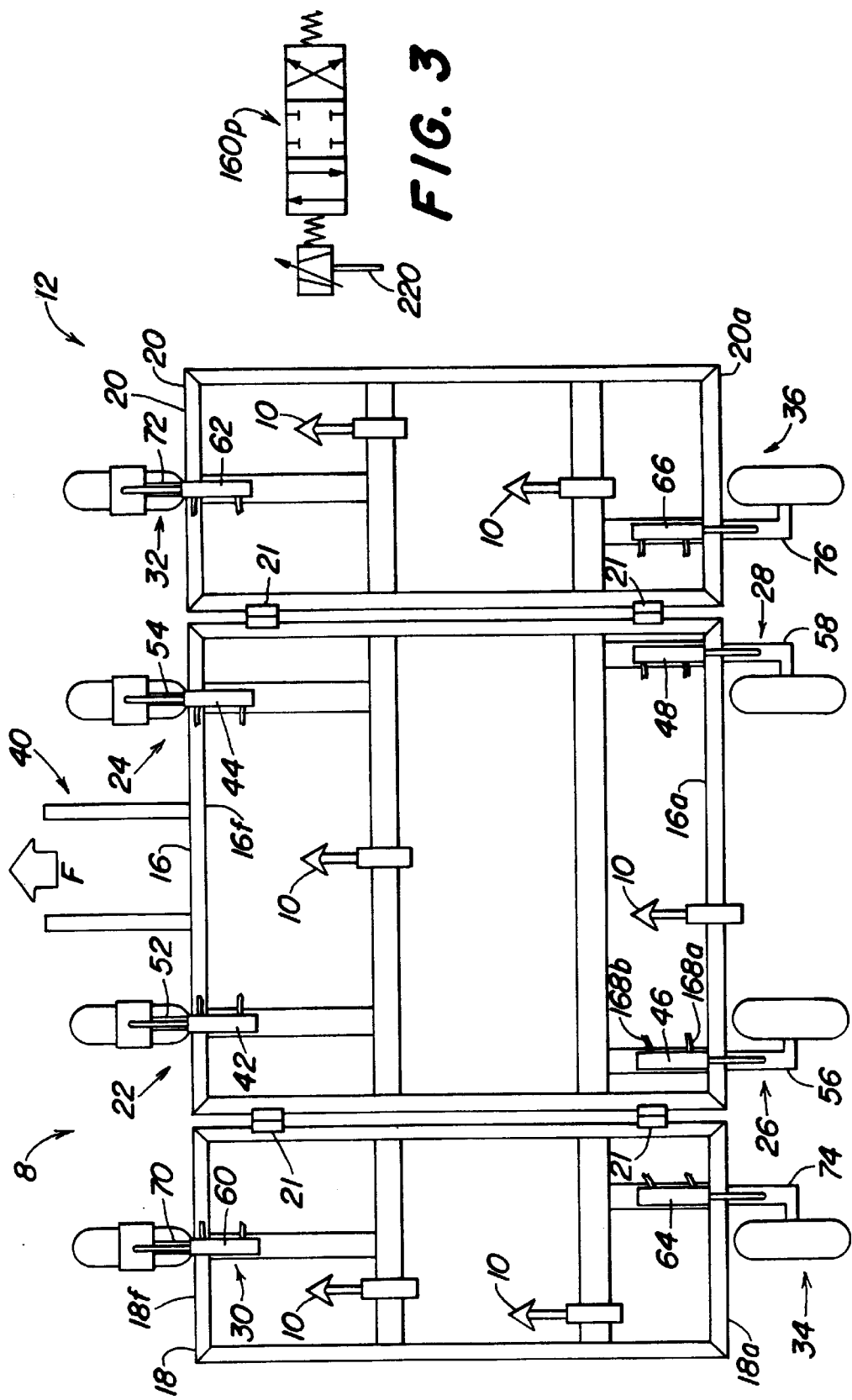
FIG. 1 is a top view of a portion of a tillage implement frame with a lift system.

Referring now to FIG. 1, therein is shown generally at 8 an implement with earthworking tools 10 supported from a transversely extending frame 12. The frame 12 includes a center frame or section 16 and wing sections 18 and 20 pivotally connected at hinge locations 21 to the center section 16 for pivoting relative to the center section about fore-and-aft extending axes. First and second center frame lift assemblies 22 and 24 are connected to a forward portion 16f of the section 16, and rear center section lift assemblies 26 and 28 are connected to aft portion 16a of the section 16. The wing sections 18 and 20 include forward wing lift assemblies 30 and 32 connected to forward portions 18f and 20f, respectively. Rear wing lift assemblies 34 and 36 are connected to rear portions 18a and 20a. Hitch structure 40 is pivotally supported from the forward portion 16f for connection to a tractor (not shown) for towing the implement 10 forwardly (F) over a field.

The lift assemblies 22, 24, 26 and 28 include double acting cylinders 42, 44, 46 and 48 connected to wheel support arms 52, 54, 56 and 58, respectively, which are pivotally connected to the center frame 16. The lift assemblies 30, 32, 34 and 36 include cylinders 60, 62, 64 and 66 connected to wheel support arms 70, 72, 74 and 76, respectively, which are pivotally connected to the wing sections 18 and 20. When the cylinders are extended, the corresponding portions of the frames are lifted relative to the ground. By retracting the cylinders, the portions are lowered relative to the ground.

The lift assemblies move the frame 12 between a raised transport position wherein the tools 10 are offset a substantial distance above the ground and a lowered field-working position wherein the tools 10 penetrate the ground. In the field-working position, the wheel assembly cylinders can be extended or retracted to adjust the depth of penetration of the tools 10 from a shallow skimming position to a lowermost deep tillage position. The wheel assembly cylinders can be adjusted in any frame position to vary the wing positions relative to the position of the center section 16 and to level the frame or vary section height from side-to-side and from front to rear.

Figure 2:
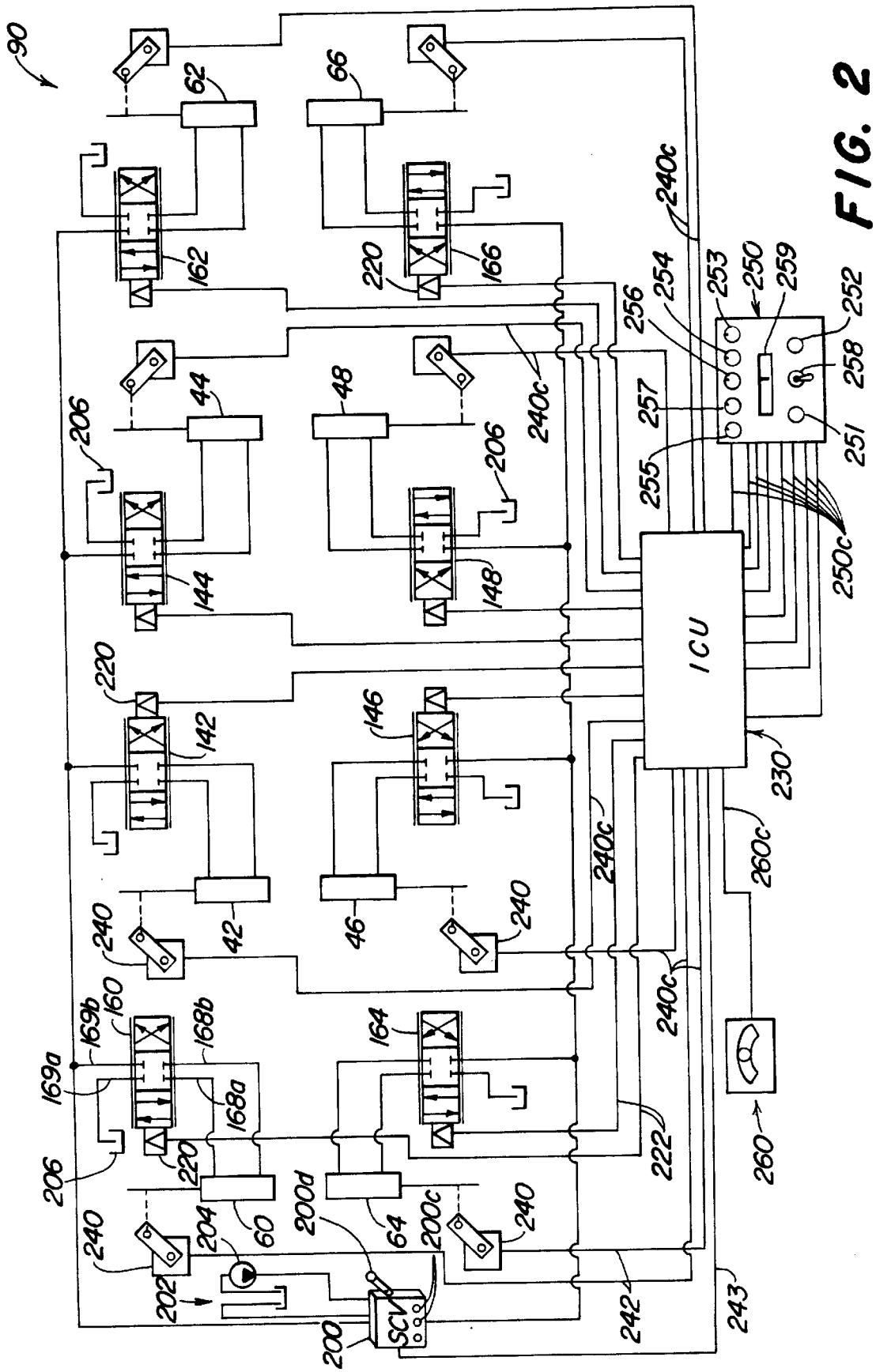
FIG. 2 is a schematic diagram of the lift system of FIG. 1.

Referring now to FIG. 2, a lift control system 90 is shown for the implement 8. The system 90 includes individual electrohydraulic control valves 142, 144, 146 and 148 connected to the lift assembly cylinders 42, 44, 46 and 48 for controlling the center section cylinders to position of the center section 16 relative to the ground. Electrohydraulic valves 160, 162, 164 and 166 are connected to the cylinders 60, 62, 64 and 66 for controlling the wing sections cylinders to position the wing sections 18 and 20 relative to the ground. As shown in FIG. 2 the valves are three position, four way valves having outlet ports 168a and 168b connected to the rod and base ends of the corresponding cylinder. Inlet ports 169a and 169b are connected through a selective control valve (SCV) 200 to a source of pressurized hydraulic fluid 202 on the towing vehicle. The source 202 includes a pressurized line 204 from pump, and a sump 206. The port 169b of each of the valves 142–148 and 160–166 is returned to the sump 206. The ports 196b are connected to the line 204 through the SCV 200. The SCV structure is preferably of the type utilized with the (RE67869) module for the commercially available 8000 series John Deere tractors.

Each of the electrohydraulic control valves 142–148 and 160–166 includes a control terminal 220 connected to a separate output terminal 222 of an implement control unit (ICU) 230. The ICU 230 provides a separate control signal to each of the valves to control the corresponding cylinder. A raise signal at a terminal 220 will move the valve from the neutral blocking position shown in FIG. 2 to the right to pressurize the base end of the cylinder via line 168b and return the rod end to sump to extend the cylinder and cause the corresponding lift assembly to raise the corresponding portion of the frame 12 relative to the ground. A lower signal at the terminal 220 will move the valve to the opposite position to pressurize the rod end of the cylinder and return the base end to sump so that the cylinder retracts and causes the corresponding lift assembly to lower the corresponding portion of the frame relative to the ground. In the absence of a raise or lower signal at the control terminal 220, the valve remains in the neutral blocking position as shown to maintain the given cylinder position which retains the frame portion in the same position relative to the ground. As shown in FIG. 2, the valves are turned on and off to provide the necessary flow to the corresponding cylinders to achieve the desired cylinder position. However, proportional valves, such as shown at 160p in FIG. 3, may also be utilized to vary flow to and from each cylinder and achieve the desired cylinder position. The fluid flow to each cylinder can be adjusted in proportion to the difference between the actual detected position and the desired position of the wheel assembly. The proportional valve 160p provides smoother operation than the on-off valve structure 160 shown in FIG. 2.

Figure 4:
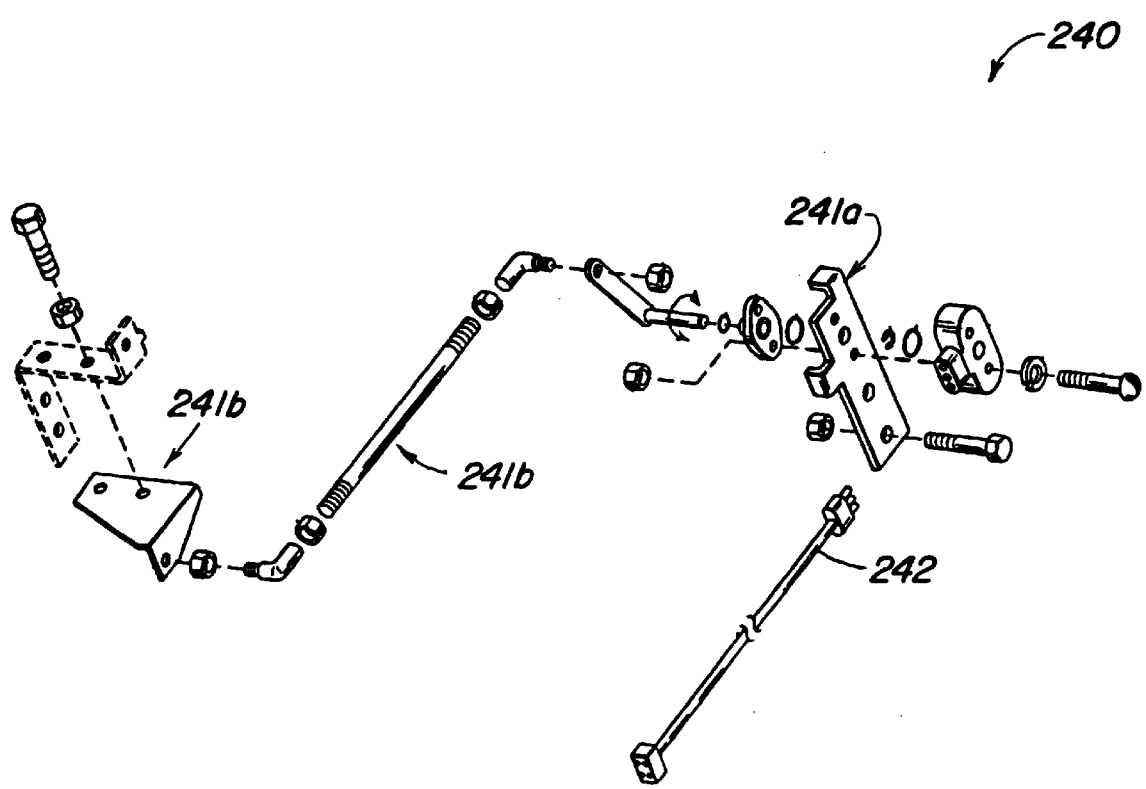
FIG. 4 is an exploded view of a linkage including a transducer for use with the system of FIG. 1.

A transducer or feedback potentiometer 240 (FIGS. 2 & 4) is associated with each of the lift assemblies 22–28 and 30–36 and provides a feedback voltage V1 corresponding either to cylinder stroke length or the position of the lift assembly operated by the cylinder. The transducer 240 includes a transducer mounting 241a fixed to the frame portion and a linkage portion 241b connected for movement with the lift assembly and responsive to extension and retraction of the corresponding lift cylinder. Each transducer 240 is connected via line 242 to a separate input terminal 240c on the ICU 230. The ICU preferably is of the type the type of controller utilized with the aforementioned hitch/SCV controller commercially available on the John Deere series 8000 tractors and modified to read the additional analog inputs form the transducers 240 for control of the individual lift cylinders. Also, a valve control signal is provided via line 243 from the ICU to the selective control unit of the SCV 200. The SCV 200 is controlled from the ICU and from conventional setup controls 200c and a standard SCV lever 200d.

The ICU compares the voltage V1 on the line 242 from the transducer 240 for each lift assembly with a desired signal voltage V2 for that lift assembly. The ICU also compares the signal voltage for each lift assembly with the signal voltages of the other lift assemblies to raise and lower the machine evenly and to provide any desired leveling and tilt functions. The desired signal voltage is obtained by the ICU 230 from an operator control unit (OCU) 250 in the tractor cab via lines 250c and by a front-to-back tilt control 260 connected via line 260c to the ICU. The OCU 250 includes a level reference control 251 and a zero reference control 252. A depth control 253 and intermediate depth control 254 control working depth in the field-working positions. A right wing offset control 255 and a left wing offset control 256 facilitate adjustment of the wings 18 and 20 relative to the center frame 16. A center level control 257 adjusts the height of the left side of the center frame relative to the right side of the frame 16. An enable/disable switch 258 facilitates resetting of the positions. A digital readout 259 provides an indication of the depth selected by the control 253. The depth controls preferably include variable resistors with rotatable knobs having detents for various operating conditions and for convenient return to a preselected level setting after the offset control feature has been utilized.

The tilt control 260 provides an offset voltage for the desired position of the front wheel assemblies relative to the back wheel assemblies for easy adjustment of the front-to-back tilt of the frame 12. For example, it may be desirable for the forward tools 10 to operate at a different depth of penetration than the rear tools, particularly when different sets of tools are mounted on the front and back of the implement. Also during transport frame tilt may be desirable for better clearance.

The intermediate control 254 can be activated to move the frame 12 to a position where the tools 10 shallowly engage the soil, for example, when removing tire tracks without deep tillage or when turning around when the tools 10 do not have to be lifted completely out of the ground. The intermediate control is also useful when the implement is moving over ground irregularities such as gullies or waterways.

In operation, after the operator has attached the implement 8 to the tractor and connected the hydraulic lines between the implement and the tractor, the SCV setup is activated and the implement is moved to a level surface. The SCV lever is moved to raise the wheels from the ground and then the level is placed in the float position so the wheel assemblies contact the level surface. The operator then pushes the lever reference control 251 to establish the voltage reference levels from the transducers 240 corresponding to the level reference position. The implement is then raised and towed to the field where the frame 12 is lowered until the tools 10 make contact with the surface. The zero reference control 252 is depressed to establish a zero level reference for the particular field conditions. The operator then turns the depth control knob 253 until the desired operating depth is indicated on the digital readout 259. Initially, the right and left wing offsets 255 and 256 and the center level control 257 are positioned in the detent positions for level operation. The SCV lever is activated and the implement wheel assemblies lower the frame 12 under the control of the ICU 230. The ICU receives the transducer voltage signals and controls the individual electrohydraulic valves to retract the cylinders to assure level lowering. Once the implement 8 is operating in the field, the wing controls 255 and 256 can be moved from their detent positions to provide an offset voltage to raise or lower a wing section 18 or 20 independently of the center section 16 for better level control. If for any reason one side of the center section 16 is operating at a different level than the opposite side, the level control 257 can be moved to provide an offset voltage to change the positions of the wheel assemblies 22,46 relative to the assemblies 24,28 in the direction level the section. If the operator wishes to change the depth of operation of the rear tools 10 relative to the front tools 10, he simply adjusts the tilt control 260 to provide a voltage offset for the transducers 240 for the front wheel assemblies 22,24,30,32 relative to the transducers for the rear assemblies 26,28,34,36.

If an intermediate depth control is desired, for example, during turnarounds or when passing over a waterway, the operator simply activates the intermediate depth control 254. Multiple detents can also be provided for the depth controls 253 and 254 to establish easily selectable working depths for different conditions.

To raise the implement 8, the operator selects the raise function at the SCV 200, and the feedback system assures that the cylinders extend generally in unison to raise the implement in a level condition. The tilt control 260 may be utilized in the raised position for better transport stability and ground clearance. The enable/disable control 258 provides reference level reset and an override for normal SCV operation without depth and offset controls.

Although eight wheel assemblies are shown, the present system may be utilized with different numbers of wheel assemblies and cylinders. For example, it may be desirable for some implements to have only a pair of wheel assemblies on the central frame 16 and a single wheel assembly on each of the wings. Also, mechanical linkages may be utilized to operate the rear wheel assembly from the forward wheel assembly when front-to-back tilt capability from the tractor cab is not needed. Different cylinders with different strokes and different lift wheel assemblies can be easily accommodated by the ICU 230 and transducers 220.

Having described the preferred embodiment, it will become apparent that various modifications can be made without departing from the scope of the invention as defined in the accompanying claims.

We claim:

1. In an agricultural implement having a transversely extending, tool-supporting frame with forward and aft portions and center and outer sections, the frame adapted for movement forwardly over the ground by a towing vehicle and supported by a plurality of transversely spaced vertically movable lift wheel assemblies for raising and lowering the frame relative to the ground, a lift control system comprising: hydraulic cylinders connected to the lift wheel assemblies; control valve structure connected to the hydraulic cylinders and to a source of hydraulic fluid under pressure, the control valve structure selectively operable to extend and retract the hydraulic cylinders to operate the lift wheel assemblies to raise and lower the frame;

transducer members responsive to operation of the lift wheel assemblies and providing output signals dependent upon the position of the frame; and an electronic control unit connected to the control valve structure and the transducer members and responsive to the transducer output signals to individually operate the hydraulic cylinders for positioning the frame at a preselected position relative to the ground, wherein the center section of the frame is substantially supported by one or more of the lift wheel assemblies when the frame is raised relative to the ground.

2. The lift control system as set forth in claim 1 wherein the control valve structure comprises an electrohydraulic valve connected between the source and each of the cylinders.

3. The lift control system as set forth in claim 2 wherein the electrohydraulic valve comprises an on-off valve.

4. The lift control system as set forth in claim 2 wherein the electrohydraulic valve comprises a proportional valve for providing a flow of fluid dependent upon the output signals of the transducer members.

5. The lift control system as set forth in claim 1 wherein the transducer members include a transducer providing a voltage dependent on extension of each cylinder.

6. The lift control system as set forth in claim 1 wherein the transducer members include a transducer providing a voltage dependent on the location of a portion of the lift wheel assemblies.

7. The lift control system as set forth in claim 1 wherein the control unit includes an offset control to maintaining selected portions of the frame at different positions relative to each other.

8. The lift control system as set forth in claim 7 wherein the lift assemblies include first and second fore-and-aft spaced lift assemblies, the offset control providing adjustment of the forward portion of the frame relative to the aft portion.

9. The lift control system as set forth in claim 7 wherein the outer section is pivotally connected to the center section, the center and outer sections each including at least one of the lift wheel assemblies, and the offset control is adjustable to vary the operation of the lift wheel assembly on the outer section relative to the lift wheel assembly on the center section to adjust the operating depth of the outer section relative to the operating depth of the center section.

10. The lift control system as set forth in claim 1 including a zero reference control for establishing a reference level for the depth of penetration of tools mounted on the frame.

11. The lift control system as set forth in claim 1 including a level reference control for establishing a frame level condition.

12. The lift control system as set forth in claim 11 including an operator control for establishing offset conditions from the frame level condition.

13. In an agricultural implement having a transversely extending, tool-supporting frame with a forward portion and an aft portion and adapted for movement forwardly over the ground by a towing vehicle and supported by a plurality of transversely spaced lift assemblies for raising and lowering the frame relative to the ground, a lift control system comprising:

hydraulic cylinders connected to the lift assemblies;

control valve structure connected to the hydraulic cylinders and to a source of hydraulic fluid under pressure, the control valve structure selectively operable to extend and retract the hydraulic cylinders to operate the lift assemblies to raise and lower the frame;

transducer members responsive to operation of the lift assemblies and providing output signals dependent upon the position of the frame;

an electronic control unit connected to the control valve structure and the transducer members and responsive to the transducer output signals to individually operate the hydraulic cylinders for positioning the frame at a preselected position relative to the ground; and wherein the control unit includes an offset control to maintain selected portions of the frame at different positions relative to each other, including a tilt control for adjusting the forward portion of the frame relative to the aft portion of the frame.

14. The lift control system of claim 13 including a level control for adjusting the level of one section of the frame relative to another section of the frame.

15. In an agricultural implement having a transversely extending, tool-supporting frame with a forward portion and an aft portion and adapted for movement forwardly over the ground by a towing vehicle and supported by a plurality of transversely spaced lift assemblies for raising and lowering the frame relative to the ground, a lift control system comprising:

hydraulic cylinders connected to the lift assemblies;

control valve structure connected to the hydraulic cylinders and to a source of hydraulic fluid under pressure, the control valve structure selectively operable to extend and retract the hydraulic cylinders to operate the lift assemblies to raise and lower the frame;

transducer members responsive to operation of the lift assemblies and providing output signals dependent upon the position of the frame;

an electronic control unit connected to the control valve structure and the transducer members and responsive to the transducer output signals to individually operate the hydraulic cylinders for positioning the frame at a preselected position relative to the ground; and including a first depth control and an intermediate depth control, the first depth control selecting a normal field condition operating depth, and the intermediate control selecting a second depth offset from the normal field condition operating depth.

16. The lift control of claim 15 wherein the first and intermediate depth controls comprise detented selection structure.

17. In an agricultural implement having a transversely extending, tool-supporting frame with a forward portion and an aft portion and central and side sections, the frame adapted for movement forwardly over the ground by a towing vehicle and supported by a plurality of transversely spaced lift assemblies for raising and lowering the central and side sections relative to the ground including central lift wheel assemblies providing support for the central section, a lift control system comprising:

hydraulic cylinders connected to the lift assemblies including central lift wheel cylinders connected to the central lift wheel assemblies;

control valve structure connected to the hydraulic cylinders and to a source of hydraulic fluid under pressure, the control valve structure selectively operable to extend and retract the hydraulic cylinders to operate the lift assemblies to raise and lower the frame;

transducer members responsive to operation of the lift assemblies and providing output signals dependent upon the position of the frame;

an electronic control unit connected to the control valve structure and the transducer members and responsive to the transducer output signals to individually operate the hydraulic cylinders and position the frame at a preselected position relative to the ground including a first offset control for adjusting the depth of penetration of tools carried by the central section relative to the depth of penetration tools carried by at least one of the side sections, and a second offset control providing adjustment of the central lift wheel assemblies relative to each other.

18. The lift control system as set forth in claim 17 wherein the central wheel assemblies are offset fore-and-aft from each other, and including a third offset control providing adjustment of the forward portion of the frame relative to the aft portion of the frame.

19. The lift control system as set forth in claim 18 wherein the central wheel assemblies are controlled by individual hydraulic cylinders and are unconnected by mechanical lift linkages.

20. The lift control system as set forth in claim 17 wherein the central wheel assemblies are transversely offset from each other, and wherein the second offset control provides adjustment of a side of the central section relative to an opposite side of the central section.

21. In an implement adapted for forward movement over the ground and including a transversely extending frame supporting earthworking tools, lift wheel assemblies supported from the frame and selectively positionable to raise and lower the tools between raised transport positions and lowered field-working positions and to vary the location of the earthworking tools when the tools are in a field-working position, the lift wheel assemblies including individual lift motors, a lift control comprising:

electrohydraulic valve structure connected to the lift motors;

a source of hydraulic fluid under pressure selectively connectable to the electrohydraulic valve structure;

transducers associated with the lift motors and providing transducer signals dependent on the position of each of the lift assemblies;

an operator control unit (OCU) for providing desired position signals;

an implement control unit (ICU) having inputs connected to the transducers and to the OCU, and outputs connected to the electrohydraulic valve structure, wherein the ICU is responsive to the transducer signals and desired position signals for controlling the valve structure to individually control the lift motors and maintain the tools at desired positions relative to the ground;

wherein the OCU includes controls for selectively varying the position of the tools adjacent one of the lift wheel assemblies relative to the position of the tools adjacent another of the lift wheel assemblies; and further including a level reference control providing level reference signals to the ICU corresponding to a preselected level condition of the frame.

22. The lift control as set forth in claim 21 wherein the OCU includes an offset control to adjust the relative vertical position of transversely spaced tools away from tool position at the level reference.

23. The lift control as set forth in claim 22 further comprising a reset control to override the reference level signal provided to the ICU.

24. The lift control as set forth in claim 21 wherein the lift assemblies are transversely spaced along substantially the entire width of the frame, and further comprising a tilt control providing an offset signal to the ICU for selectively varying the control of the individual lift motors to tilt the frame and thereby vary the position of the tools adjacent one of the lift assemblies relative to the tools adjacent another of the lift assemblies when the tools are in the field-working position.

* * * * *